United States Patent [19]
Yanda

[11] 3,938,480
[45] Feb. 17, 1976

[54] INTERNAL COMBUSTION ENGINE
[76] Inventor: Leon M. Yanda, Rte. No. 1, Box 45A, Augusta, Kans. 67010
[22] Filed: Feb. 4, 1974
[21] Appl. No.: 439,384

[52] U.S. Cl. .............................. 123/43 B; 123/8.47
[51] Int. Cl.² ......................................... F02B 57/00
[58] Field of Search ........................ 123/43 B, 8.47

[56] References Cited
UNITED STATES PATENTS

| 150,350 | 4/1874 | Palmer | 123/43 B |
| 1,547,991 | 7/1925 | Wood | 123/43 B |
| 1,695,888 | 12/1928 | Dowdey | 123/43 B |
| 1,823,132 | 9/1931 | Cunningham | 123/43 B |
| 1,860,707 | 5/1932 | Ezbelent | 123/43 B |
| 2,170,213 | 8/1939 | Prew | 123/43 B |
| 2,280,967 | 4/1942 | Nelson | 123/43 B |
| 2,899,945 | 8/1959 | Carvalho | 123/43 B |
| 3,739,755 | 6/1973 | Folstadt | 123/43 B |

FOREIGN PATENTS OR APPLICATIONS

| 450,230 | 1949 | Italy | 123/43 B |

Primary Examiner—Clarence R. Gordon
Attorney, Agent, or Firm—Gifford, Chandler & Sheridan

[57] ABSTRACT

A reciprocating piston device has its pistons and cylinders arranged in a circle, each piston and each cylinder being rotatable about a common shaft to which power is directed or, alternatively, to which power is supplied depending on the use to which the device is put. For example, the device may be a fluid pump, a fluid motor, a diesel engine, a two cycle engine, a four cycle engine, or the like. In a preferred embodiment, two pistons and two cylinders form a part of a first rotor and two other pistons and two other cylinders form a part of a second rotor. Each piston forming a part of one rotor is mounted for reciprocal movement within a cylinder of the other rotor.

18 Claims, 4 Drawing Figures

U.S. Patent  Feb 17, 1976  Sheet 1 of 2  3,938,480
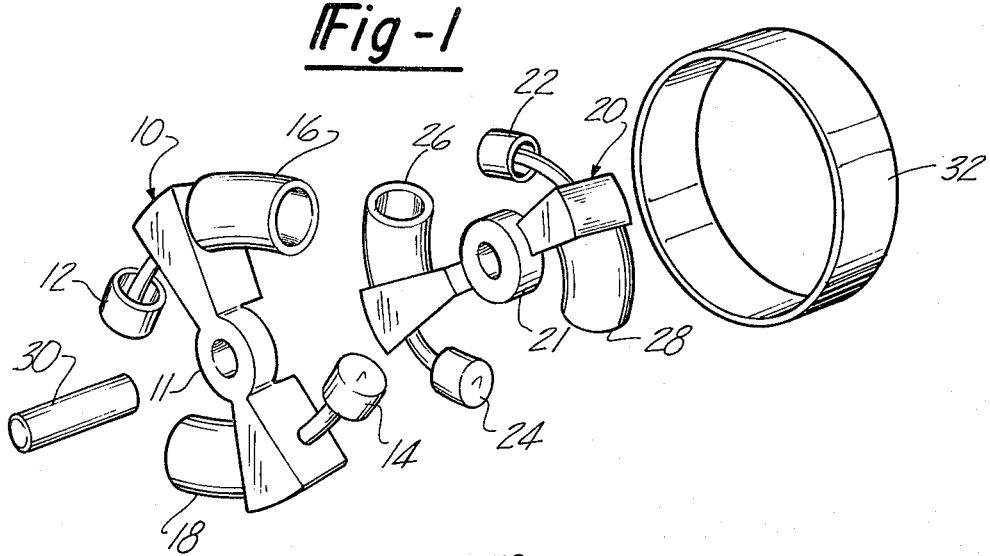
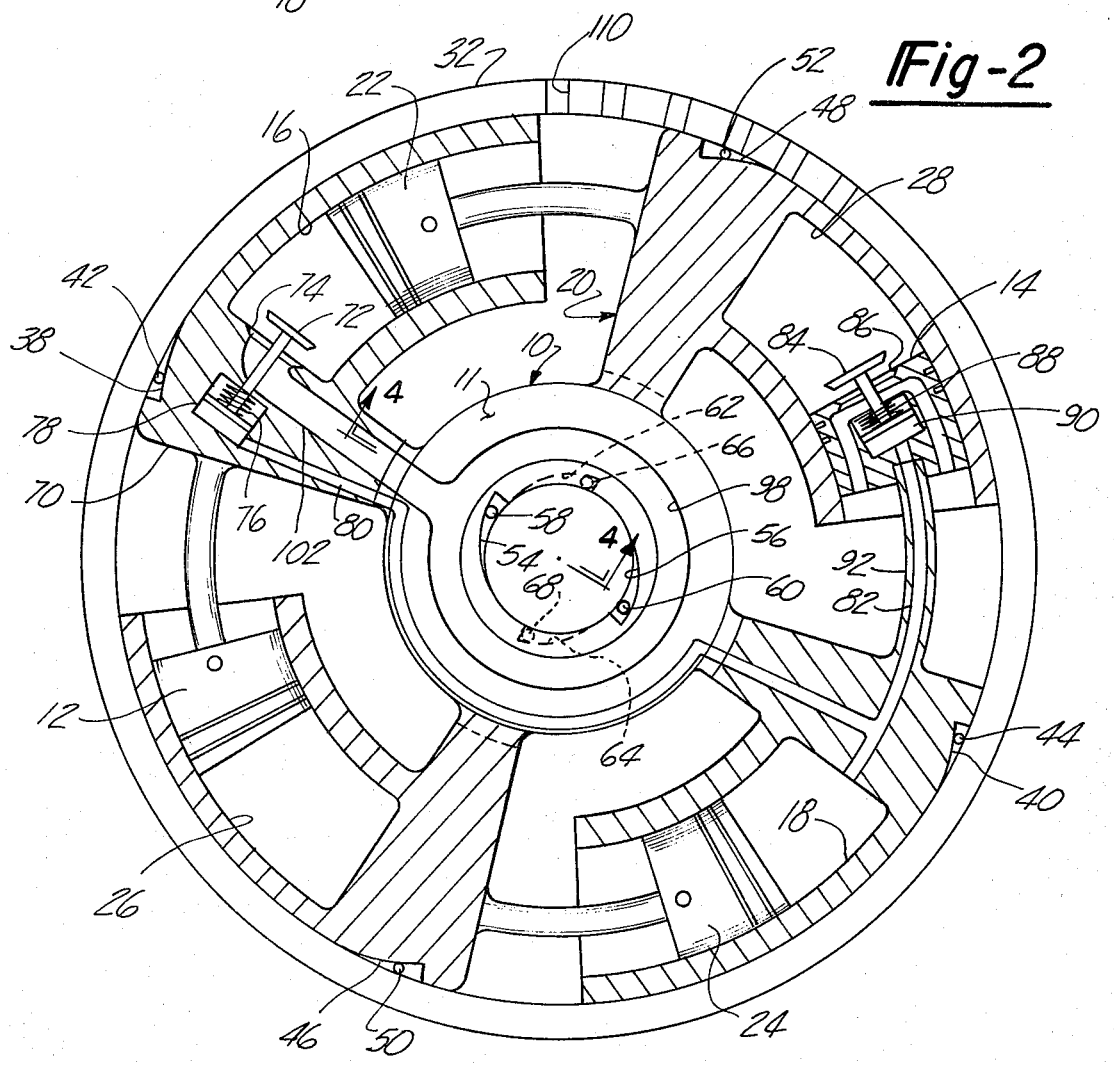

INTERNAL COMBUSTION ENGINE

FIELD OF THE INVENTION

The invention is a reciprocating piston device such as a fluid pump, a fluid motor, a diesel engine, a two cycle engine, a four cycle engine, and the like. Referring to a four cycle internal combustion piston engine by way of example, the device is conventional to the extent that the pistons are mounted for reciprocal movement within cylinders. It is unconventional in the sense that the pistons and cylinders are mounted on rotors and the entire piston-cylinder assembly moves in a circular path around a shaft.

There has been a movement in the internal combustion engine art toward rotary engines. Some of the latter have been of the Wankel type and have presented difficult problems in the sealing of gas chambers. Others have involved the use of impellers or pistons which move in annular channels wherein, for example, portions of the annular channels between successive impellers become combustion chambers or, for example, wherein a hollowed out portion of a leading piston together with the hollowed out portion of a follower piston forms a combustion chamber. Examples of the foregoing are the rotary engines disclosed by Sinnott in U.S. Pat. No. 3,282,258 and by Prochazka et al. in U.S. Pat. No. 3,304,921. This latter type of rotary engine also presents difficult sealing problems in that they require high leakage and high friction annular combustion chamber seals and sealing rings to slide over ports, slots, and surface edges leading to high wear situations.

There is, therefore, a need for a rotary engine which does not require such high leakage seals and wherein piston sealing rings contact only smooth surfaces. There is also a need for variable compression ratio operation for improved pollution control and operational flexibility.

SUMMARY OF THE INVENTION

The invention is a reciprocating piston device wherein the piston-cylinder assemblies are arranged in a circular pattern, each piston and each cylinder being rotatable about a common shaft to which power is directed as in the case of an engine, or to which power is supplied from outside in the case of a fluid pump. For simplicity of description the invention will be described in detail with reference to a four cylinder, four cycle, internal combustion engine. Thus in a preferred embodiment, the engine comprises (a) a shaft; (b) a pair of rotor members mounted for successive alternate rotational movements around said shaft; (c) a pair of oppositely disposed cylinders as a part of each said rotor; (d) a pair of oppositely disposed pistons as a part of each said rotor, each piston of one rotor being positioned for reciprocal movement within a cylinder of another rotor to form a circular arrangement of piston-cylinder assemblies; (e) means for transmitting a torque from a rotating rotor to said shaft to effect angular rotation of said shaft in a predetermined direction; and (f) means for preventing rotation of a rotor in an angular direction opposite to that of the rotation of said shaft.

By way of example, the four piston-cylinder assemblies may be, respectively, in the following positions:

1. A first assembly wherein compression has taken place and following ignition, the power stroke has just begun.
2. A second assembly wherein the intake stroke has taken place and the compression stroke has just begun.
3. A third assembly wherein the exhaust stroke has just taken place and the intake stroke has just begun.
4. A fourth assembly wherein the power stroke has taken place and the exhaust stroke has just begun.

In the example, and as the power stroke takes place, the piston of said first assembly is moved angularly relative to its associated stationary cylinder, the cylinder of said second assembly is moved angularly relative to its associated stationary piston (compression), the piston of said third assembly is moved angularly relative to its associated stationary cylinder (intake) and the cylinder of said fourth assembly is moved angularly relative to its associated stationary piston (exhaust). In this sequence the two moving pistons and the two moving cylinders are part of the same rotor and effect a tangential force to the shaft upon which the rotor is mounted. Further, during the foregoing sequence the second rotor, of which the remaining two pistons and two cylinders are a part, remains stationary. During the next successive power thrust it is the first rotor which remains stationary and the second rotor which moves.

Although an engine will be described herein as comprising two rotors and four cylinders (the preferred embodiment), a larger number of rotors can be used to build an embodiment comprising, for example, six or eight cylinders in a single circular arrangement. It is preferred, however, that larger engines such as an eight cylinder engine, be constructed by mounting two of the four cylinder devices on a single shaft.

As will be described more fully hereinafter a suitable ignition system, a fuel inlet, and a combustion gas outlet are provided. A novel valve-in-piston arrangement for the exhaust of combustion gases will also be described.

DESCRIPTION OF THE DRAWINGS

FIG. 1 is an exploded diagrammatic view, in perspective, of the engine of the invention with details omitted for clarity;

FIG. 2 is a diagrammatic view, in cross section, of the invention showing the piston-cylinder arrangement, a portion of the fuel inlet system, and a portion of the outlet for exhaust gases;

DESCRIPTION OF THE PREFERRED EMBODIMENT

Figure 3:
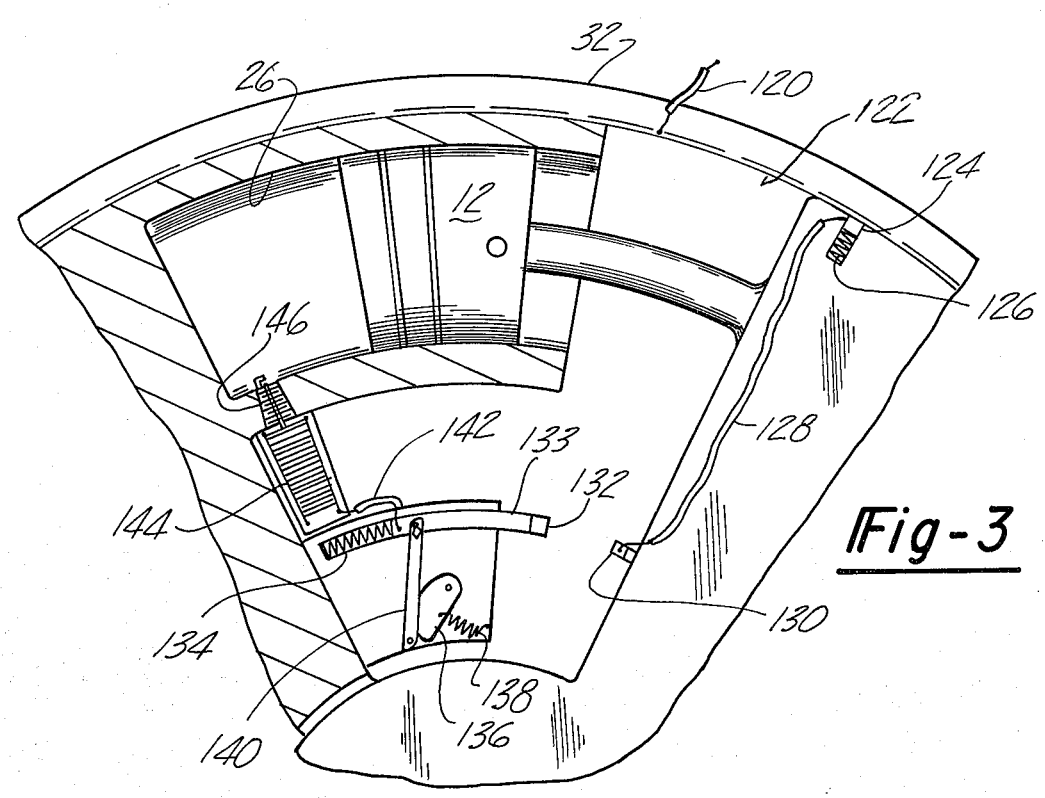
FIG. 3 is a diagrammatic view of an ignition system which is suitable for use in the engine of the invention.

Referring particularly to FIGS. 1 and 2, a first rotor 10 is shown as including a hub 11, oppositely disposed pistons 12, 14 and oppositely disposed cylinders 16, 18. A second rotor 20 is shown as including a hub 21, oppositely disposed pistons 22, 24 and oppositely disposed cylinders 26, 28. Hubs 11, 21 are mounted coaxially on shaft 30 in a manner such that piston 12 is positioned for reciprocal movement within cylinder 26, piston 14 is positioned for reciprocal movement within cylinder 28, piston 22 is positioned for reciprocal movement within cylinder 16, and piston 24 is positioned for reciprocal movement within cylinder 18.

Figure 4:
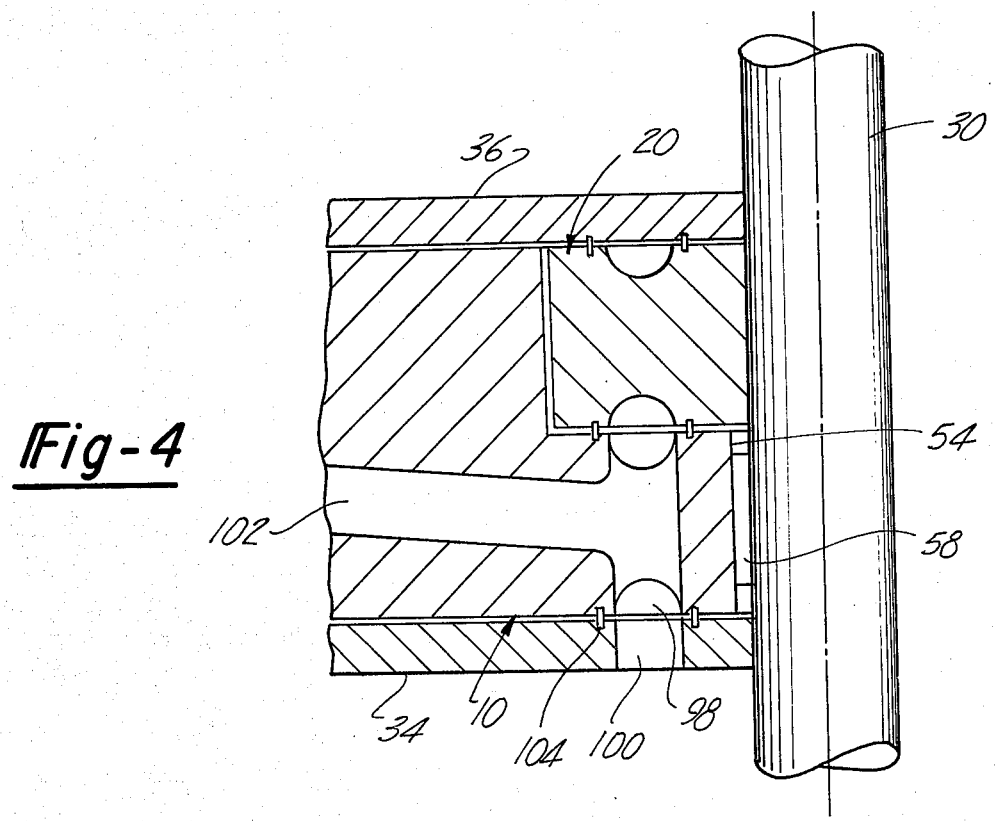
FIG. 4 is a view of the rotors of the engine of the invention taken along the line 4—4 of FIG. 2.

The piston-cylinder assembly is encased in a cylindrical case 32 with suitable end plates 34 and 36 (see FIG. 4).

First rotor 10 is provided with oppositely disposed peripheral cam surfaces 38, 40 and wedges 42, 44 to prevent counterclockwise rotation (as shown in FIG. 2) of the first rotor 10 relative to the case 32. Similarly, the second rotor 20 is provided with oppositely disposed peripheral cam surfaces 46, 48 and wedges 50, 52 to prevent counterclockwise rotation of the second rotor 20 relative to the case 32.

First rotor 10 is also provided with oppositely disposed hub cam surfaces 54, 56 and wedges 58, 60 to effect a rotation of the shaft 30 in a clockwise direction when the first rotor 10 is moving in a clockwise direction (as shown in FIG. 2). Similarly, second rotor 20 is also provided with oppositely disposed hub cam surfaces 62, 64 and wedges 66, 68 to effect a rotation of the shaft 30 in a clockwise direction when the second rotor 20 is moving in a clockwise direction.

Each cylinder head, such as the cylinder head 70 of cylinder 16 is provided with a valve 72, a valve seat 74, a spring 76 biasing the valve 72 to a closed position, and a pressure cylinder 78. A conduit 80 in the first rotor 10 joins pressure cylinder 78 with an conduit 82 for transmission of pressure therebetween.

Each piston such as piston 14 is provided with a valve 84, a valve seat 86, a spring 88 biasing the valve to a closed position, and a pressure cylinder 90. Conduit 82 extends through piston rod 92 and extends to cylinder 18 for pressure transmission therethrough.

Each hub such as hub 11 of first rotor 10, in addition to the pressure transmitting conduits 80, 82 leading respectively from pressure chamber 78 and from pressure chamber 90, is provided with an annular groove 98 which joins holes 100 (see FIG. 4) in said plate 34 with a fuel conduit 102 for transmission of fuel therebetween. Seals, such as seal 104, contain the fuel between the fixed end plate 34 and the moving hub 11. Holes 110 in the periphery of the case 32 allow exhaust gases to flow from inside the case, away from the engine. Although not shown in the drawings, it is preferred that holes 110 extend completely around the periphery of case 32.

Referring to FIG. 3 a wire 120 carries electric current to a slip ring 122 insulated from and embedded in the inner surface of the case 32. A carbon or similar brush 124 is biased outwardly by a spring 126. A wire 128 conducts current from the brush 124 to a fixed breaker point 130 adjacent a variable breaker point 132 on slide bar 133, the latter being biased toward the fixed breaker point 130 by spring 134.

A counterweight 136, adapted to move outwardly away from tension spring 138 in response to increasing centrifugal force, bears against linkage 140 to slide bar 133.

A wire 142 conducts current to voltage increasing coil 144 and to spark plug 146.

DESCRIPTION OF OPERATION

Starting with cylinder 26 (a part of rotor 20) in which compression is assumed to be taking place the following events occur:

To effect compression cylinder 26 is moving clockwise (as shown in FIG. 2) and piston 12 is stationary. Meanwhile, movable breaker point 132 (moveable with cylinder 26) is moving toward stationary, fixed breaker point 130 (movable with piston 12). When the air-fuel mixture in cylinder 26 has reached a predetermined desirable compression ratio breaker point 132 contacts breaker point 130 and ignition occurs.

Ignition in cylinder 26 imparts a clockwise force to piston 12 (and rotor 10) and a counterclockwise force to cylinder 26 (and rotor 20). Piston 12 moves clockwise but counterclockwise movement of cylinder 26 is prevented by the wedging action of wedges 50, 52 against cam surfaces 46, 48 respectively. Movement of piston 12 angularly relative to cylinder 26 moves breaker fixed point 130 away from breaker point 132 to interrupt the spark in spark plug 146.

As the fuel mixture in cylinder 26 is undergoing compression, as indicated above, rotor 20 is rotating clockwise carrying piston 22 in a clockwise direction in an intake stroke. Meanwhile cylinder 16 is stationary. Because of an increase in pressure in pressure cylinder 78, valve 72 is open to receive fuel therethrough. The increase in pressure in pressure cylinder 78 is effected by the simultaneous power stroke taking place in cylinder 18, as will be apparent as the description proceeds.

The fuel mixture enters the engine through holes 100 in the end plate 34, passes through the annular groove 98, through the conduit 102, and into cylinder 16.

As compression is taking place in cylinder 26 and intake of fuel is taking place in cylinder 16, exhaust is taking place from cylinder 28. Movement of rotor 20 effects the clockwise rotation of cylinder 28, piston 14 being stationary. Exhaust gas flows through open valve 84 in piston 14, through the inside of piston 14, into the spaces around the pistons and cylinders and through the holes 110 in case 32. Valve 84 is opened because of pressure in pressure cylinder 90, the pressure being derived from the power stroke in cylinder 18.

Similarly, as compression is taking place in cylinder 26, a power stroke is taking place in cylinder 18. Fuel combustion effects a clockwise force to piston 24 and to rotor 20. The pressure developed in cylinder 18 is transmitted through conduit 82 to the pressure cylinder 90 in piston 14 and through conduit 80 to the pressure cylinder 78.

When ignition has occurred in cylinder 26 it, of course, becomes the site of the power stroke; when fuel intake has been completed in cylinder 16 it becomes the site of the compression stroke; when exhaust has been completed in cylinder 28 it becomes the site of the intake stroke; and when the power stroke has been completed in cylinder 18 it becomes the site of the exhaust stroke. In other words, that stroke which occurs in a given piston-cylinder assembly will then occur next in the piston-cylinder assembly in front of it in the direction of rotation.

As described above a power stroke involving, for example, piston 12 and cylinder 26 will effect the rotation of piston 12 and rotor 10 in a clockwise direction (as shown in FIG. 2), cylinder 26 and rotor 20 being held stationary by the wedging action of wedges 50 and 52 against cam surfaces 46 and 48 respectively. The clockwise rotation of rotor 10 imparts a torque to shaft 30 by the wedging action of wedges 58 and 60 against cam surfaces 54 and 56 respectively.

When the power stroke in cylinder 26 has been completed, and the next power stroke occurs in cylinder 16. This power stroke effects the rotation of piston 22 and rotor 20 in a clockwise direction while cylinder 16 and rotor 10 remains stationary because of the wedging action of wedges 42 and 44 against cam surfaces 38 and 40 respectively. The rotation of rotor 20 imparts a torque to shaft 30 by the wedging action of wedges 66 and 68 against cam surfaces 62 and 64 respectively.

Referring to the ignition system, as illustrated in FIG. 3, it will be noted that the time of ignition relative to the degree of compression can be altered, first, by varying the setting of the slide bar 133 and the variable breaker point 132 relative to the fixed breaker point 130. If the breaker points 130 and 132 are set farther apart there will be a relatively greater compression of the fuel mixture in cylinder 26 prior to ignition. In this manner the engine of the invention is capable of operating under a variety of compression ratios.

Secondly, the compression ratio can be made responsive to changes in centrifugal force. As the rate of rotation of cylinder 26, for example, is increased during compression, the counterweight 136 swings outwardly to effect a displacement of linkage 140 to the left (as shown in FIG. 3), a movement of slide bar 133 to the left, and a relative widening of the gap between variable breaker point 132 and fixed breaker point 130. In this manner an increase in angular velocity of the cylinder results similarly in a higher compression ratio at ignition.

It will be apparent that linkage 140 can be mounted relative to counterweight 136 that an increase in centrifugal force will move linkage 140 to the right. In this manner an increase in angular velocity of a cylinder results in a lower compression ratio at ignition.

Thirdly, the time of ignition relative to the compression ratio can be varied as a function of both centrifugal force and the original setting of the two breaker points. By way of example, a predetermined setting of the breaker points 130 and 132 can be made to provide a specific compression ratio at ignition and the latter ratio can then be varied up or down, as desired, by making the ratio responsive to changes, plus or minus, in centrifugal force.

When the foregoing adjustments have been made in a manner sufficient to attain the compression ratios of diesel engines, ignition can be dispensed with entirely and the device of the invention can be operated as a diesel.

In addition to the advantage of providing a selection of compression ratios, the engine of the invention does not present the usual sealing problem of rotary engines. The seals 104 separate "low pressure" chambers requiring a minimum of sealing from each other.

It will be apparent that the engine can be constructed with any desired cubic inch displacement. Similarly torque can be varied by positioning the pistons and cylinders farther from the hub of the rotors, giving the rotors a longer moment arm.

It will also be apparent to one skilled in the art that conversion of the device of the invention from a four cycle engine to a two cycle engine involves a mere rearrangement of the valve operations. In the case of fluid pumps torque is transmitted to the rotors by effecting the rotation of the case 32 by power supplied from the outside while the shaft 30 remains stationery. When used as a pump two piston-cylinders are pumping while the other two are intaking fluid from within the case and around the cylinders. The fluid pump ramps are all pointed in a direction opposite to that shown in FIG. 2 for an engine and the pressurized fluid from the cylinders in the pressure strokes is directed through suitable small passages to the cams and wedges to lock the case 32 to the rotor to be moved and to lock the other rotor to the stationary shaft 30.

I claim:

1. A reciprocating piston device comprising:
   a. a shaft;
   b. a plurality of rotor members mounted on said shaft for successive alternate rotational movements around said shaft;
   c. a pair of oppositely disposed cylinders as a part of each said rotor;
   d. a pair of oppositely disposed pistons as a part of each said rotor, each piston of one rotor being positioned for reciprocal movement within a cylinder of another rotor to form a circular arrangement of piston-cylinder assemblies;
   e. inlet valve means for the introduction of fluid into each said cylinder;
   f. outlet valve means for the removal of fluid from each said cylinder;
   g. means for imparting said alternate movements to said rotors;
   h. means for preventing rotation of a rotor in an angular direction opposite to that of the rotation of another rotor; and
   i. conduit means extending from each said assembly and establishing respectively fluid connection with said valve inlet means of the cylinder oppositely disposed to said assembly and with said outlet means of the cylinder following said assembly in said circular arrangement to effect the opening of both said valve means in response to an increase in fluid pressure in the cylinder of said assembly.

2. The device as defined in claim 1 wherein there are two of said rotors.

3. The device as defined in claim 1 wherein there are a plurality of said circular arrangements of piston-cylinder assemblies, the said arrangements being mounted coaxially on said shaft.

4. The device as defined in claim 3, wherein there are two of said rotors in each said circular arrangement.

5. The device as defined in claim 1 wherein said device is a fluid motor.

6. The device as defined in claim 1 wherein said device is a fluid pump.

7. The device as defined in claim 1 wherein said device is a two cycle internal combustion engine.

8. A four cycle internal combustion engine comprising:
   a. a shaft;
   b. a plurality of rotor members mounted for successive alternate rotational movements around said shaft;
   c. a pair of oppositely disposed cylinders as a part of each said rotor;
   d. a pair of oppositely disposed pistons as a part of each said rotor, each piston of one rotor being positioned for reciprocal movement within a cylinder of another rotor to form a circular arrangement of piston-cylinder assemblies;
   e. inlet valve means for the introduction of a combustion mixture into each said cylinder;
   f. outlet valve means for the removal of exhaust gases from each said cylinder;
   g. means for transmitting torque from a rotating rotor to said shaft to effect angular rotation of said shaft;
   h. means for preventing rotation of a rotor in an angular direction opposite to that of the rotation of said shaft; and
   i. conduit means extending from each said assembly and establishing respectively fluid connection with said valve inlet means to the cylinder oppositely disposed to said assembly and with said outlet means of the cylinder following said assembly in said circular arrangement to effect the opening of both said valves in response to an increase in gas pressure in the cylinder of said assembly.

9. The engine as defined in claim 8 wherein there are two of said rotors.

10. The engine as defined in claim 8 wherein there are a plurality of said circular arrangements of piston-cylinder assemblies, the said arrangements being mounted coaxially on said shaft.

11. The engine as defined in claim 10 wherein there are two of said rotors in each said circular arrangement.

12. The engine as defined in claim 8 and comprising an ignition device, said device comprising:
   a. a first breaker point movable with a piston and connected to a source of electric current;
   b. a second breaker point movable with the cylinder associated with said latter piston; and
   c. a spark plug connected electrically to said second breaker point;
   d. means to bring said breaker points into contact and to effect ignition by said spark plug; and
   e. wherein the compression ratio of the fuel in said cylinder is determined by the timing of contact between said breaker points.

13. The engine as defined in claim 12 and wherein said second breaker point is secured to a slide bar secured to said cylinder and adjustable relative thereto and to said first breaker point, said timing of contact being alterable by the adjustment of the position of said slide bar relative to said first breaker point.

14. The engine as defined in claim 12 and including means responsive to centrifugal force to determine the time of contact between said two breaker points relative to the angular velocity of said cylinder.

15. The engine as defined in claim 8 and including a fuel gas chamber in the hub of each said rotor for the receiving of fuel therein and conduits in each said rotor for the passage of said fuel from the rotor hub to the cylinders forming a part of said rotor.

16. The engine as defined in claim 8 and including a case containing said engine; an exhaust gas chamber surrounding said piston-cylinder assemblies; and holes in the periphery of said case for the passage of exhaust gas from said chamber and said case.

17. A four cycle internal combustion engine comprising:
   a. a shaft;
   b. a plurality of rotor members mounted for successive alternate rotational movements around said shaft;
   c. a pair of oppositely disposed cylinders as a part of each said rotor;
   d. a pair of oppositely disposed pistons as a part of each said rotor, each piston of one rotor being positioned for reciprocal movement within a cylinder of another rotor to form a circular arrangement of piston-cylinder assemblies;
   e. valve means for the introduction of a combustion mixture into each said cylinder;
   f. means for transmitting torque from a rotating rotor to said shaft to effect angular rotation of said shaft;
   g. means for preventing rotation of a rotor in an angular direction opposite to that of the rotation of said shaft;
   h. a valve seat in each piston which respectively defines an opening between the interior of each said latter piston and the gas chamber of its associated cylinder;
   i. a normally closed valve member which cooperates with said valve seat to control the flow of exhaust gas from said chamber; and
   j. a conduit joining said latter piston interior with the cylinder positioned ahead of said piston-cylinder assembly in said arrangement; and
   k. wherein said valve is opened in response to an increase in gas pressure in said cylinder positioned ahead, said pressure being transmitted via said conduit.

18. The engine as defined in claim 8 and including:
   j. an ignition device wherein the compression ratio in said cylinder is responsive to changes in the angular velocity of said cylinder;
   k. a hub in each said rotor;
   l. a fuel gas chamber in each said hub for receiving fuel therein;
   m. conduits in each rotor for the passage of fuel from said fuel gas chamber to the cylinders forming a part of said rotor;
   n. a case containing said engine;
   o. an exhaust gas chamber surrounding said piston-cylinder assemblies;
   p. holes in said case for the passage of exhaust gas from said exhaust chamber and said case; and
   Q. a gas seal separating said fuel gas chamber and said exhaust gas chamber.

* * * * *